No. 682,727. Patented Sept. 17, 1901.
L. W. LUELLEN.
VOTING BOOTH.
(Application filed Feb. 1, 1901.)
(No Model.) 3 Sheets—Sheet 1.
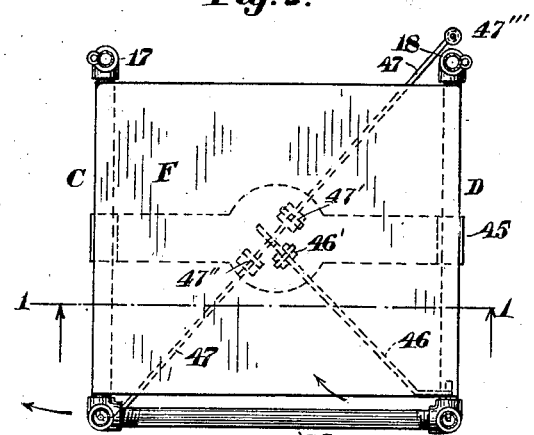
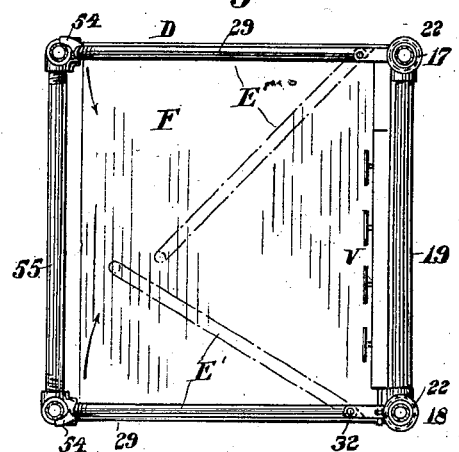
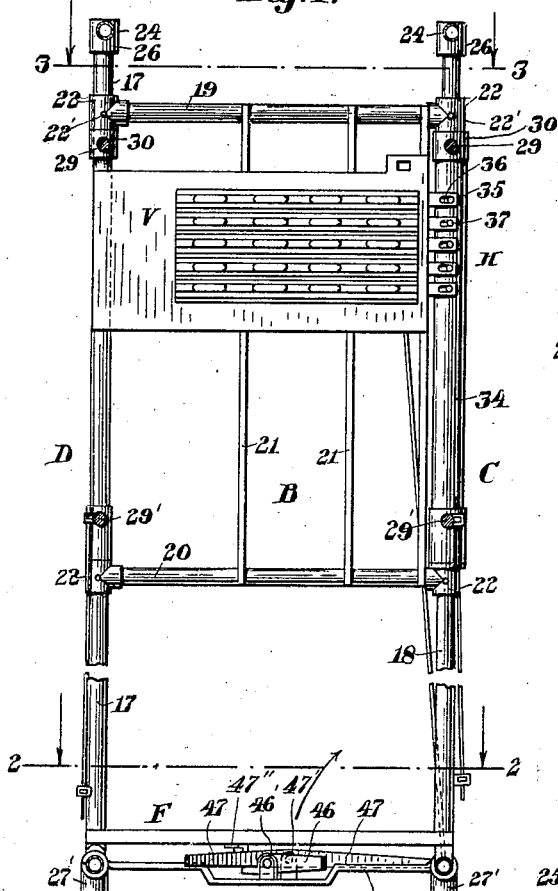
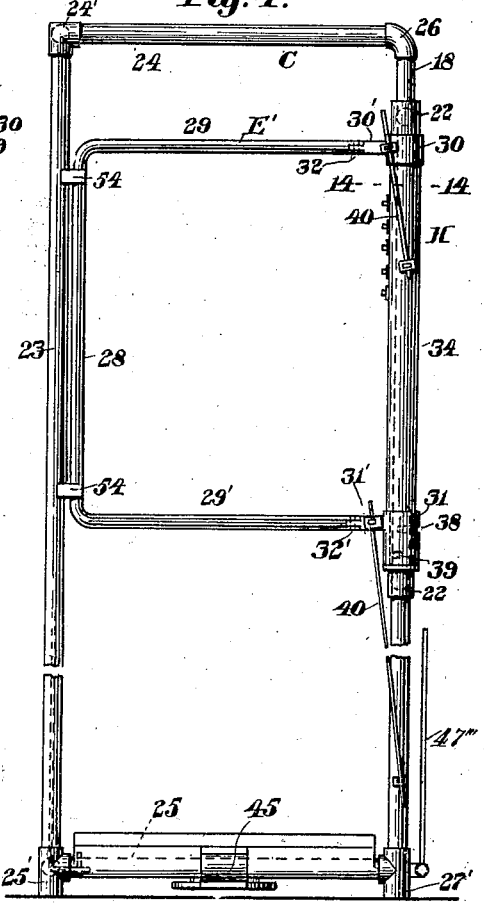
Witnesses:
Walter E. Lombard
L. C. Wood
Inventor:
Lawrence W. Luellen,
by C. Whitney, Atty.

No. 682,727. Patented Sept. 17, 1901.
L. W. LUELLEN.
VOTING BOOTH.
(Application filed Feb. 1, 1901.)
(No Model.) 3 Sheets—Sheet 2.
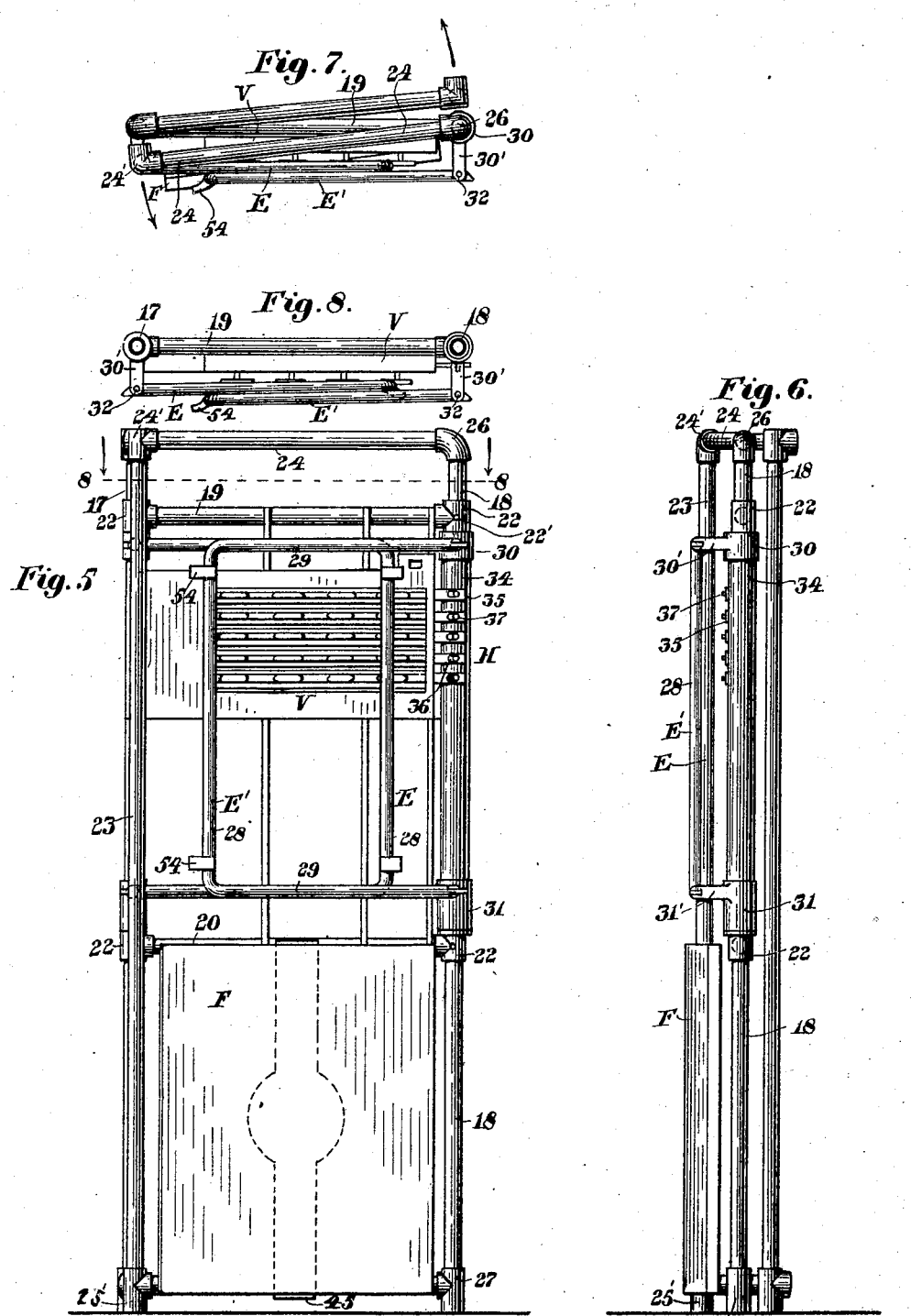
Witnesses:
Walter E. Lombard
L. C. Wood
Inventor:
Lawrence W. Luellen,
by C. Whitney, Atty.

No. 682,727. Patented Sept. 17, 1901.
L. W. LUELLEN.
VOTING BOOTH.
(Application filed Feb. 1, 1901.)
(No Model.) 3 Sheets—Sheet 3.
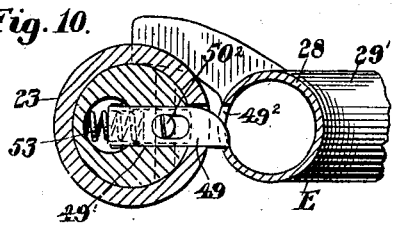
Fig. 10.
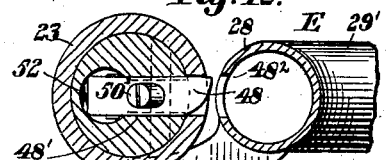
Fig. 12.
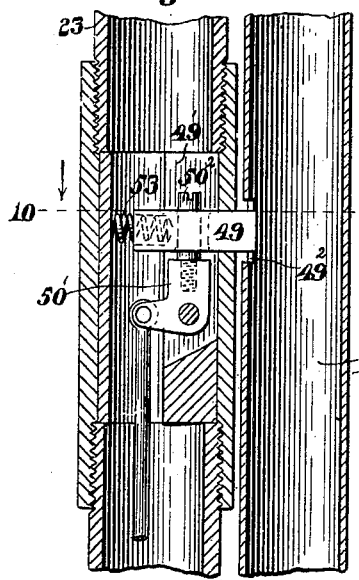
Fig. 9.
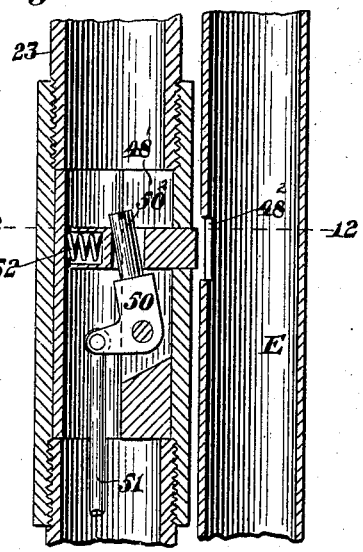
Fig. 11.
Fig. 13.
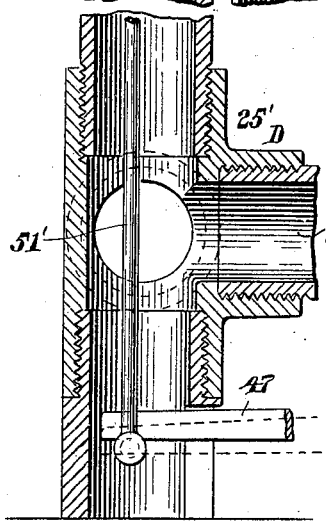
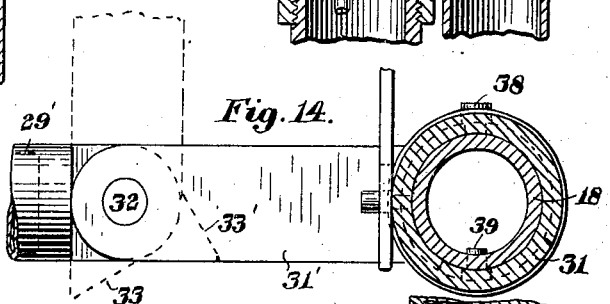
Fig. 14.
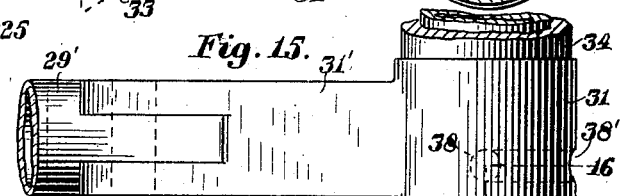
Fig. 15.
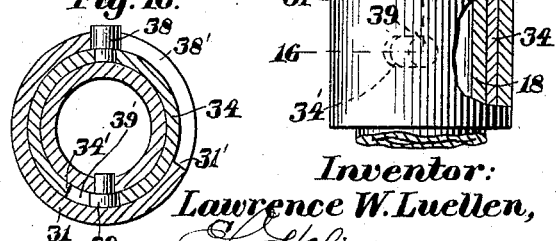
Fig. 16.
Witnesses:
Walter E. Lombard
L. C. Wood
Inventor:
Lawrence W. Luellen,
by Whitney
Atty.

UNITED STATES PATENT OFFICE.

LAWRENCE W. LUELLEN, OF OLATHE, KANSAS.

VOTING-BOOTH.

SPECIFICATION forming part of Letters Patent No. 682,727, dated September 17, 1901.

Application filed February 1, 1901. Serial No. 45,616. (No model.)

*To all whom it may concern:*

Be it known that I, LAWRENCE W. LUELLEN, a citizen of the United States of America, and a resident of Olathe, in the county of Johnson and State of Kansas, have invented certain new and useful Improvements in Voting-Booths, of which the following is a specification.

This invention relates to voting-booths.

An object of the present invention is to furnish an improved, simplified, durable, rigid, and inexpensive voting-booth adapted readily to be folded up without disassembling the parts thereof into compact form for shipment from place to place and adapted readily to be unfolded and set up ready for use by any inexperienced person.

A further object of the invention is to provide in a voting-booth having independently-operative entrance and exit doors improved automatically-operative instrumentalities controlled by the weight of the voter upon the platform or floor for locking the entrance-door and simultaneously unlocking the exit-door on the entrance of a person to the booth and for unlocking the entrance-door and simultaneously locking the exit-door when the person steps off of said platform on the exit of the person from the booth.

A further object of my invention is to provide an improved voting-booth comprising an end frame adapted for supporting a voting-machine, two side frames in pivotal connection with the end frame and adapted to be folded into overlapping relation with said end frame, a platform or floor in pivotal connection with one side frame and adapted to be turned up into parallelism with said side frame and carried by said frame into overlapping relation with the end frame, and two door-frames, each pivotally connected at one end with the side frame and having a break-joint whereby the same may be swung into overlapping substantial parallel relation with the end frame and in advance of the voting-machine, as hereinafter described.

With these objects in view the invention consists in certain details of construction and in the combination and arrangement of the several parts of the voting-booth, substantially as hereinafter described, and more particularly pointed out in the claims.

In the drawings accompanying and forming part of this specification, Figure 1 is a front elevation, partly in vertical longitudinal section, of a voting-booth embodying my invention in one form thereof, the section being taken on a line corresponding with the dotted line 1 1 in Fig. 2 looking in the direction of the arrows, the parts of the booth being shown in their open or unfolded positions or in the positions they occupy when the booth is set up ready for use. Fig. 2 is a horizontal cross-section of the voting-booth, taken on the dotted line 2 2 in Fig. 1 looking in the direction of the arrows. Fig. 3 is a similar cross-sectional view taken on the dotted line 3 3 in Fig. 1 and looking in the direction of the arrows. Fig. 4 is a side elevation of the voting-booth as seen from the right in Fig. 1, a portion of the voting-machine proper being omitted. Fig. 5 is a front elevation of a voting-booth, showing the parts in the position they occupy when the booth is closed or the parts in folded relation ready for shipment. Fig. 6 is a side elevation of the folded booth as seen from the right in Fig. 5, Fig. 7 is a plan view of the folded booth as seen from above in Fig. 5. Fig. 8 is a cross-sectional view taken on the dotted line 8 8 in Fig. 5 as seen from above in said figure. Fig. 9 is a vertical sectional detail, on an enlarged scale, of a portion of one of the side frames and a portion of the exit-door, showing in elevation the locking mechanism for said door, the lock-bolt being shown in its advanced door-locking position. Fig. 10 is a cross-sectional view of the parts shown in Fig. 9, said section being taken on the dotted line 10 10 in said figure looking in the direction of the arrow. Fig. 11 is a vertical section, on the same scale as Fig. 10, of a portion of the entrance-door and a portion of the side frame, showing parts of the door-locking mechanism with the bolt in its retracted position. Fig. 12 is a cross-section taken on the dotted line 12 12 in Fig. 11 looking in the direction of the arrow and showing the same parts. Fig. 13 is a detail in side elevation on the same scale as Fig. 9 of the support for the bolt and bolt-actuator. Fig. 14 is a cross-sectional detail taken on a line corresponding with the dotted line 14 14 in Fig. 4 and showing, on the same scale as Fig. 9, the break-joint of the door and the manner in which the door, side frame, and end frame are pivotally connected together, and also showing a key-locking strip and the manner in which the same is connected to be operated by the door. Fig. 15 is a side elevation of the parts shown in Fig. 14, and Fig. 16 is a cross-sectional view taken on the dotted line 16 16 in Fig. 15 looking in the direction of the arrow.

Similar characters indicate like parts in all the figures of the drawings.

In the preferred construction and organization thereof (shown in the accompanying drawings) the voting-booth comprises, essentially, a main end frame B, embodying two end posts or uprights 17 and 18; two side frames (designated in a general way by C and D, respectively) in hinged or pivotal connection with the end posts 17 and 18, respectively, of the stationary frame B; two doors (designated by E and E', respectively) in hinged connection with the two end posts 17 and 18, respectively, of the end frame; a normally horizontal platform or floor F, supported for vertical movements between the side frames and having a pivotal connection at one end with one of said side frames, whereby the same may be swung into a vertical position and moved, with said side frame, into substantial parallelism with the vertical plane of the end frame, and door-locking mechanism operable by the platform, on vertical movements thereof, for locking one door and unlocking the other door simultaneously, and having a hinged or pivotal connection at one end with one side frame, whereby the same may be swung upward with the platform into substantial parallelism with said side frame.

The end frame B, in the form thereof shown it the accompanying drawings, comprises the two tubular end posts or parallel uprights 17 and 18, which constitute two of the supporting-legs of the booth, the two horizontally-disposed tubular cross-bars 19 and 20 extending between and rigidly connecting the two end posts, and vertical parallel tie-bars (each of which is designated by 21) connecting the bars 19 and 20, the construction of the parts being such that the end frame will constitute a rigid and convenient support for a voting-machine, as indicated at V in Figs. 1, 3, 5, 7, and 8 of the drawings, and which voting-machine may be of a construction and organization similar to that described in my prior patent, No. 651,874, to which reference may be had. The cross-bars 19 and 20 are shown secured to the posts or uprights 17 and 18 by ordinary T-couplings 22, which couplings are shown held in place on the post by pins 22' extending through the same and through said posts.

The side frames C and D are shown somewhat in the nature of U-shaped skeleton frames having their inner or open ends in hinged or pivotal connection with the upper and lower ends of the two posts or uprights 17 and 18, respectively, each frame preferably consisting of a vertically-disposed tubular post 23 and two horizontally-disposed upper and lower side bars 24 and 25 connected at one end by pipe-couplings 24' and 25' to the upper and lower ends, respectively, of said post 23 and rotatably connected at their other ends by couplings 26 and 27' to the upper and lower ends, respectively, of one of the posts or uprights of the end frame B, the side bars 24 and 25 having their connections with the upper and lower ends of said end-frame posts considerably above and below, respectively, the cross-bars 19 and 20 of said end frame, the construction and organization of the side frames being such that they may be folded over into substantial parallelism with each other, and when so folded the post of one side frame will be disposed in advance, and the post of the other side frame will be disposed in the rear of the posts of the end frame and in close proximity thereto, and the upper and lower bars of said side frames will be disposed with their longitudinal axes oblique to and above and below, respectively, the longitudinal axes of the upper and lower bars of the end frame. (See Figs. 5, 6, and 7.)

The entrance and exit door frames E and E' are shown somewhat U-shaped and have pivotal connections at their open ends with the posts or uprights 17 and 18 of the end frame B and each consists in the preferred construction and organization thereof (shown most clearly in Figs. 4, 14, and 15) of a vertically-disposed front bar 28, two horizontally-disposed upper and lower bars 29 and 29', all of which bars are preferably formed integral from a single piece of metal tubing or gas-pipe, and two couplings or sockets 30 and 31 rotatably mounted upon the end-frame post intermediate the points of connection of the upper and lower cross-bars 19 and 20 of said end frame with said post and having radial extensions 30' and 31' pivotally connected at 32 and 32' with the upper and lower bars 29 and 29' of said door-frame. To form the pivotal connection 32' between the extension of the coupling or socket and the horizontal bar of the door-frame, the outer end of said extension is preferably bifurcated or slotted horizontally, and the outer end of the door-frame bar has a flattened projection or portion fitting between the forks of said bifurcated extension, and a pin is passed vertically through the members, the outer end of the bar and the inner wall of the bifurcated extension being preferably beveled, as shown at 33 and 33', to form a stop and stop-abutment to prevent relative movement of the extension and bar in one direction—that is, to hold the extension and bar in axial alinement during the ordinary opening and closing movements of the door-frame, as will be readily understood.

It is desired to state in the above connection that the invention is not limited to the particular construction and organization illustrated in the accompanying drawings of the end frame, side frames, and door-frames, as it will be obvious that these may be variously modified without departure from this invention.

By providing the upper and lower portions of the door-frame with break-joints the front portion of said frame may be turned inward at right angles to the extension, so that it may lie in close proximity to the front of the voting-machine, the break-joint being located a distance from the pivotal point of the door-frame slightly greater than the distance from the front face of the keys of the voting-machine to a line intersecting the axes of the two end-frame posts 17 and 18.

In operative connection with and practically constituting a part of one of the door-frames (shown as the door-frame E) I have provided a key-releasing or key-setting device (designated in a general way by H) the construction and organization of which is such that it will be effective on a movement of the door in one direction for imparting a key-releasing movement to the key-locking strips of the voting-machine V when the voting-booth is in its open position ready for use and will in no wise interfere with nor require disassembling to permit the folding of the booth to the forms illustrated in Figs. 5 and 7. This key-releasing device in the preferred construction and organization thereof (shown most clearly in Figs. 1, 5, 14, and 15) comprises a tube 34, surrounding the end post 18 between the upper and lower T-couplings of the upper and lower bars 19 and 20 of the end frame B and extending through and having a movable connection with the lower socket or coupling 31 of the door-frame, a plurality of key-locking strips 35, each having an elongated slot 36 in the outer end thereof, and a plurality of pins or projections 37, fixed to the tube 34 and entering the elongated slots 36 in the ends of the key-locking strips or bars 37. These key-locking strips may be of any suitable or well-known construction and organization, but preferably of the construction and organization described in Patent No. 651,874, hereinbefore referred to.

As a means for imparting a strip-actuating movement to the key-releasing device during the first part of the opening movement of the door-frame and to permit a continued opening movement of said door-frame independent of any movement of said key-releasing device I have provided in connection with the concentric rotative members of said key-releasing device and with the concentrically-disposed fixed post extending through said members two movement-limiting devices, shown as stop-pins 38 and 39, respectively, the former pin 38 of which is fixed to the tube 34 and extends through a transverse slot 38' in the coupling 31, which constitutes one hinge of the door, and the latter pin 39 of which is fixed to the post and extends into a short transverse slot 39', formed through the tube 34, the construction and disposition of the stop-pins and slots being such that during the first part of the opening movement of the door the coupling 31 and tube 34 will move together a short distance in concentric arcs or until the end wall 34' of the slot 39' strikes the stop-pin 39, when the tube will be arrested in its rotative movement and the coupling 31 will continue its rotative movement until the end wall 31' strikes the stop-pin 38, when said coupling will be arrested in its rotative movement.

As a means for automatically closing the door-frames I have provided in connection therewith suitable door-closing springs, each of which is designated by 40 and which preferably are of the torsion-spring type. One of these springs is shown connected at its lower end with the tube 34 and at its upper end with an extension 30' of the door-frame E and not only constitutes a means for closing the door-frame, but also acts to impart a rotative strip-releasing movement to the strip-actuating tube 34 during the first part of the opening movement of said door-frame, as will be readily understood by reference to Figs. 4, 14, 15, and 16 of the drawings.

From the foregoing it will be seen that the key-releasing device includes three relatively concentric members disposed about a common center and one of which is stationary and constitutes a support for the other two and the other two of which have rotary movements of relatively different ranges about said support. The inner rotative member is rotated with the outer member through a portion of the latter's rotative movement and imparts rectilinear key-releasing movements of definite lengths to the key-locking strips during the first part of the rotative movement of the outer member, said strips being held in their key-releasing positions until a return movement of said outer member or until the door-frame is closed. As in my prior patent, the locking-strips will be provided with setting-springs (not shown) for returning the same to their normal key-engaging positions when released by the closing movement of the door-frame.

The platform or floor F, which may be of any suitable general construction and supported in any suitable manner to permit vertical movements thereof, preferably has a pivotal connection with the lower cross-bar of one of the side frames, or said cross-bar may be supported for rotative movements in the two couplings 25' and 27'; and the latter of which couplings is rotatively connected to the end-frame post, the construction being such that the platform may be tilted into a perpendicular position substantially parallel with the side frame when it is required to fold the booth into the position shown in Figs. 5 and 7.

The locking mechanism in the preferred construction and organization thereof shown most clearly in Figs. 1 and 2 comprises a support or carrier 45 in pivotal connection at one end with a lower cross-bar of one of the side frames, as C, and resting at its opposite end upon the corresponding cross-bar of the other frame, as D, said support being disposed below and in substantial parallelism with the floor F, lock-bolt-actuating levers 46 and 47, disposed intermediate the support 45 and floor F preferably in intersecting relation, and one of which levers is pivotally supported at 46' intermediate its ends upon the support or carrier 45 and the other of which levers, as 47, is fulcrumed upon the support at 47' and carries a contact portion 47", resting against the under side of the platform, while between the fulcrum and contact portion it rests upon the inner free end of the lever 46, said levers being preferably disposed substantially at right angles to each other and having their forward outer ends terminated in proximity to the upright end posts of the side frames, as indicated in full and dotted lines in Fig. 2, two reactionary lock-bolts 48 and 49, supported for horizontal reciprocatory movements in lock-bolt supports 48' and 49', secured in the corner-posts of the two frames C and D, respectively, and which bolts are disposed in position to engage in lock-notches 48² and 49² in the front bars 28 of the two door-frames E and E', two bell-crank levers 50 and 50', pivotally supported on the supports 48' and 49' for vertical oscillatory movement and each having a pin or projection 50" at its upper end disposed in an elongated slot in the lock-bolt, and vertically-disposed actuating-rods 51 and 51', pivotally connected at their upper ends to the lower arms of said bell-crank levers and connected at their lower ends to the lock-bolt-actuating levers 46 and 47, respectively, the construction and organization of these parts being such that upon a depression of the platform F the outer end of the actuating-lever 47 will be depressed, thus effecting through the medium of the rods 51 and 51' and bell-crank levers 50 and 50' a retractive door-unlocking movement of the lock-bolt 48 and an advancing or door-locking movement of the lock-bolt 49, as will be readily understood by a comparison of Figs. 1, 2, 9, and 11 of the drawings. Springs 52 and 53 are provided in connection with the inner ends of the bolts 48 and 49 to render them reactionary and prevent accidental retractive movements thereof. The rear end of the lever 47 is connected to the vertical rod 47''' for actuating a registering mechanism. (Not shown.) This rod may be weighted to counterbalance the platform and maintain it in its normal raised position. The lock-bolts are disposed to engage the door-frames substantially midway their heights, and said door-frames are so disposed that the pedal extremities of a person within the booth will be visible from the exterior of said booth, so that outsiders may at a glance see whether the booth is occupied or vacant.

By providing the door-frames with break-joints near the ends where they are pivotally connected to the posts of the end frames it will be seen that said door may be swung inward into substantial parallelism with the end frame (see Fig. 8) without disturbing the relative positions of the concentrically-disposed members which control the releasing movements of the key-locking strip, which is a matter of considerable importance, as it obviates the necessity of disconnecting the key-releasing device from said strips when it is desired to fold up the booth.

For the purpose of limiting the closing movements of the door-frames and insuring their proper positioning with respect to the lock-bolts each door-frame is provided with stop members 54, disposed to engage the outer faces of the corner-posts of the side frames.

When the booth is unfolded and in position for use, the two side frames C and D will be connected together by horizontal cross-bars 55 and 56, which have at their opposite ends right and left external screw-threads fitted into correspondingly-threaded sockets at the upper and lower ends of the corner-posts of said frames.

I claim—

1. A voting-booth including an end frame having vertically-disposed posts; two side frames pivotally connected with said posts; and a platform and a supporting member situated in a lower portion of said booth and adapted to be folded into overlapping relation with the end frame and side frames.

2. A voting-booth comprising an end frame and two side frames pivotally connected together to be folded into overlapping relation; and two door-frames pivotally connected to opposite ends of the end frame, respectively, and adapted to be swung into parallelism with said end frame.

3. A voting-booth embodying an end frame having parallel posts or uprights; two side frames in hinged connection with said posts and adapted to be swung into overlapping relation with said end frame; a platform or floor extending across the lower portion of the booth and pivotally connected to one side frame and adapted to be swung into substantial parallelism with said side frame, and a supporting member also pivoted to one of the frames the construction of the parts being such that the end frame, side frames, platform and supporting member may be folded into overlapping relation.

4. A voting-booth comprising an end frame having two tubular end posts and horizontally-disposed cross-bars connecting said posts; two skeleton side frames each in hinged connection with opposite ends of a post; a door-frame in hinged connection with each post and disposed, when in its closed position, in the vertical plane of the side frame and having stops for limiting the closing movement thereof; a platform in pivotal connection at one end to one side frame; and locking mechanism operable by said platform for locking one door-frame and for unlocking the other door-frame simultaneously.

5. A voting-booth comprising an end frame, two side frames two doors, and a movable platform pivotally connected together whereby they may be folded into overlapping relation.

6. In a voting-booth, the combination, with an end frame adapted for supporting a voting-machine and having two parallel uprights or posts at the opposite ends thereof, of two skeleton side frames each pivotally connected at opposite ends to the upper and lower ends of a post of the end frame; two door-frames each pivotally supported on a post of the end frame between upper and lower ends of the side frames and having break-joints, substantially as described; springs for imparting a closing movement to said door-frames; horizontally-reciprocatory lock-bolts for engaging the door-frames; a movable platform in pivotal connection with one side frame; and means operated by the platform for advancing one lock-bolt and retracting the other concurrently to lock one door and unlock the other door.

7. A voting-booth comprising a skeleton end frame having two parallel vertically-disposed cylindrical posts; two substantially U-shaped side frames each pivotally connected to the upper and lower ends of an end-frame post whereby they may be swung in the arc of a circle into overlapping relation with said end frame; two substantially U-shaped door-frames each disposed in the plane of a side frame between the upper and lower bars thereof and pivotally connected with a post of the end frame; two horizontally-reciprocatory lock-bolts coöperative with the two door-frames for locking the same; pivoted levers in connection with, and adapted for imparting opposing movements to, the two lock-bolts simultaneously whereby to lock one door-frame and unlock the other; a carrier for said levers in pivotal connection at one end with one side frame and normally supported at the opposite end on the lower cross-bar of the other side frame; and a platform disposed above and adapted for operating said levers and having a pivotal connection with one side frame.

8. In a voting-booth, the combination with side frames provided with door-frames and having tubular end posts, of a lock-bolt supported in an end post in position to engage and lock a door-frame; a platform within the booth; and platform-actuated means for operating the lock-bolt.

9. In a voting-booth, the combination with side frames provided with door-frames and having tubular end posts, of a lock-bolt supported in an end post in position to engage and lock a door-frame; a platform within the booth; and platform-actuated means for operating the lock-bolt, including vertically-movable levers, bell-crank levers in connection with the lock-bolts and rods connecting the bell-crank levers and vertically-movable levers.

10. In a voting-booth, the combination with an end frame and two side frames hinged together to be folded into overlapping relation; doors in each of the side frames; lock-bolts disposed in the side frames to engage said doors; a movable platform; and lock-bolt-actuating levers operable by said platform for imparting a door-locking movement to one bolt and a door-releasing movement to the other bolt.

11. In a voting-booth, the combination with an end frame and two side frames hinged together for folding into overlapping relation; a door for each of said side frames; lock-bolts disposed to engage said doors; a movable platform in pivotal connection with one side of the side frames; lock-bolt-actuating levers operable by said platform for imparting a door-locking movement to one bolt and a door-releasing movement to the other bolt; and a support for said levers having a pivotal connection with one side frame, whereby said platform, levers and support may be folded into substantial parallelism with said side frame.

12. A voting-booth comprising an end frame having means for supporting a voting-machine, and having tubular end posts; two side frames in hinged connection with the posts of the end frame; two door-frames in pivotal connection with the posts of said end frame between the upper and lower ends thereof and having break-joints whereby the front portions of said door-frames may be turned inward into overlapping relation with the end frame without changing the positions of their pivotal connections with the posts; springs for imparting closing movements to said door-frames; stops on said door-frames for limiting the closing movements thereof; bolts supported for reciprocatory movements on the side frames in position to engage the door-frames; levers pivotally supported on the end frames and having shiftable connections respectively with said bolts; bolt-actuating rods in pivotal connection with said levers; a carrier in pivotal connection at one end of one side frame and supported at its opposite end on the other side frame; bolt-actuating levers pivotally mounted on said carrier and operatively connected at their outer ends with the bolt-actuating rods; and a platform superposed with relation to, and effective on a movement thereof for operating, said bolt-actuating levers, and having one end thereof in pivotal connection with one of the side frames, substantially as and for the purpose described.

Signed by me at Hartford, Connecticut, this 7th day of January, 1901.

LAWRENCE W. LUELLEN.

Witnesses:
 E. C. WHITNEY,
 L. C. WOOD.